3,309,214
CALCINED PIGMENTS FROM KAOLIN
Ernst Podschus, Leverkusen, and Werner Joseph, Cologne-Mulheim, Germany, assignors to Farbenfabriken Bayer Aktiengesellschaft, Leverkusen, Germany, a corporation of Germany
No Drawing. Filed May 25, 1964, Ser. No. 370,038
Claims priority, application Germany, May 30, 1963, F 39,875
7 Claims. (Cl. 106—288)

This invention relates to calcined kaolin pigment and to a process for their production. The invention more particularly relates to novel calcined kaolin pigments having improved brightening power and to a process for producing the same from kaolin clays.

Kaolin clays have been used as pigments and fillers and it is known that the same show a higher degree of brightness and a higher brightening power after they have been calcined as for example at a temperature of about 1,000° C. While these kaolin pigments have proven satisfactory and show a good brightening effect where their surface forms a direct boundary layer with air, as for example in paper, and certain paints, the same have not proven completely satisfactory and do not have an adequate covering effect when embedded in a material having a higher light refractive index, as for example, when embedded in synthetic plastics or lacquers. In such cases where the light must pass through a media having a substantially higher refractive index than air prior to striking the kaolin pigments, the pigments do not show the desired brightening effect and do not have suitable covering or hiding power.

One obect of this invention is an improved calcined kaolin pigment having improved whiteness, higher brightening power and which may be used embedded in and covered by a material having a substantially higher refractive index than air as for example in plastics or lacquers.

In accordance with the invention, we have surprisingly discovered that if kaolin clay is subjected to a shock calcining, followed by a second, more prolonged heat treatment, the crystal structure and physical form of the kaolin is altered so that, in effect, a novel pigment is formed having a higher degree of whiteness and brightening power as compared to the prior known calcined kaolin pigments and which may be satisfactorily used in a media having a high refractive index.

The starting material used in accordance with the invention may be any of the known kaolin clays. These clays contain as a main component a crystalline hydrous silicate of alumina with a two layer type lattice, i.e. a sheet structure composed of units of one layer of silica tetrahedrons and one layer of alumina octahedrons. These crystalline hydrous silicates of alumina with a two layer type lattice may, for example, be in the form of the minerals kaolinite, halloysite, antigorite, fire clay, or the like. Kaolin clays, known as china clay, or porcelain clay, which have a very high content of kaolinite are preferred starting materials in accordance with the invention.

The shock calcining of the kaolin clay which constitutes the first treatment step of the process in accordance with the invention is effected at a temperature between about 600–1,000° C., and preferably at a temperature between about 700–900° C. for a period of time not in excess of about 1 second. The shock calcination, which constitutes a treatment known per se, is preferably effected in a highly turbulent hot gas stream and is most preferably effected in the manner described in British patent specification 869,966 wherein a stream of hot gas generated, for example, by burning illuminating gas is introduced tangentially at the lower end of a conical reaction chamber at high velocity and the kaolin to be heated is introduced as dust into the axial return flow caused by the conical shape of the chamber. A zone of high turbulence is formed at the boundary layers between the tangential upward flow and the axial return flow and the finely divided kaolin is heated in this zone for a period of time not exceeding a second. The calcination product leaves the reaction chamber with the gases tangentially at the upper end and is separated in a cyclone separator.

By the shock calcination the kaolin clay is at least partially dehydrated and largely consists of a product which is called metakaolin.

The kaolin after mining must be worked up by washing, classifying etc. After this treatment the kaolin results as an aqueous slurry. It is possible to feed this aqueous slurry with a kaolin content of e.g. 50% by weight into the shock calcination furnace. However, it is also possible to use the still water containing kaolin obtained after filtration from the slurry e.g. by a rotating filter. Finally the kaolin can be dried before the first calcination step, preferably by the hot gases of the shock calcination furnace. However, this drying should be effected at a temperature below about 400 to about 500° C. to prevent the kaolin from being dehydrated, as the shock calcination of kaolin which is already partially dehydrated is less effective. The kaolin can be fed into the shock calcination furnace at temperatures up to about 400 to about 500° C., corresponding to the pretreatment as outlined above. The lower temperature limit is not critical. It depends on the environment temperature and may be e.g. about −30° C. as well as about +30° C.

While the shock calcination of the kaolin has previously been proposed in order to produce material having a higher adsorption power which could be used as a carrier for liquids, such as pesticides or as a grinding aid or to prevent caking, the same is not a satisfactory pigment and does not have the whiteness or brightening power of kaolin clay which has been calcined for a longer period of time in a calcining furnace at a similar temperature.

The second heat treatment in accordance with the invention is effected at a temperature between about 800–1100° C. and preferably at a temperature between about 900–1,000° C. for a period of time of at least 10 minutes.

The second heat treatment may be effected in any conventional furnace, as for example, a rotary furnace, drum furnace, muffle furnace, or the like. The second heat treatment is generally effected for a period of about 1 hour though longer heat treatment times while generally not economical are not detrimental.

While it is not necessary to effect the second heat treatment immediately after the shock calcining and the material may be stored even for prolonged periods between the treatments, it is generally preferable and most economical to directly pass the shock calcined material to the second heating stage with a cooling only being effected to the extent necessary for increasing the degree of separation. The cooling may be effected in a heat exchanger using air which in turn is preheated for the combustion utilized in the shock calcination.

The second heat treatment should be limited to a heat treatment step per se and should not involve a chemical conversion or reaction such as a bleaching.

The combination of the two heat treatment steps effects a modification of the crystal structure. Apparently, the initial shock calcination destroys the initial crystal structure of the material as the shock calcined product appears amorphous upon X-ray diffraction analysis and additionally is looser and has a lower density. The second heat treatment causes at least partially a crystallization to $\gamma$-$Al_2O_3$ and mullite, whereby some of the $SiO_2$-content remains in the amorphous state. Due to the novel crystal and physical form resulting from the combination of the two heat treatments, the material appears substantially whiter than the prior known calcined kaolin pigments and shows superior properties when used as pigments. Thus, the pigments produced according to the invention are not only whiter per se as a powder but also produce a substantially whiter effect than the conventional calcined kaolin pigments when used in paper or paper coatings or in other sized coatings. Furthermore, pigments produced in accordance with the invention show a surprisingly high brightening power when embedded in substances with a high light refractive index, such as plastics, lacquers, or the like. The difference in the degree of whiteness between the pigments produced in accordance with the invention and the known calcined kaolin pigments is greatly emphasized if the comparison is carried out with the pigments incorporated in a material having a substantially higher refractive index than air as for example as a dispersion in linseed oil. In such a dispersion pigments in accordance with the invention appear white whereas the known calcined kaolin pigments appear yellowish-brown.

The pigments produced in accordance with the invention additionally have a lower density than the conventional calcined kaolin pigments having, for example, a specific gravity of about 1.5 to 2.0 whereas uncalcined kaolin has a value of about 2.6 and the conventional calcined product a value of about 2.4. It is assumed that pigments in accordance with the invention contain gas-filled cavities into which the liquid or embedding agent is not able to penetrate.

As compared with the prior known calcined kaolin pigments, the new pigments in accordance with the invention thus have the advantage of better whiteness, higher brightening power, and better hiding power, particularly in media with a refractive index of about 1.5. The new pigments furthermore have the advantage of a lower specific gravity. Accordingly, they are suitable for use as brightening agents and pigments for synthetic plastics and rubbers and may be used for producing paints having good hiding power which are based on dispersion binders, oils, or lacquers. In many instances, the pigments may be used to replace more expensive pigments, such as titanium dioxide or zinc sulfide or may be used as an additive to such pigments.

The following examples are given by way of illustration and not limitation:

EXAMPLE 1

A high grade finely dispersed elutriated kaolin of the following composition:

| | Percent |
|---|---|
| $SiO_2$ | 45.20 |
| $Al_2O_3$ | 38.75 |
| $Fe_2O_3$ | 0.33 |
| $TiO_2$ | 1.64 |
| MgO | 0.09 |
| $Na_2O$ | 0.28 |
| $K_2O$ | 0.05 |
| Heat loss | 14.04 | with 51% by weight of the particles having diameters below one micron; 22% by weight of the particles having diameters between 1–2 microns; 14% by weight of the particles having diameters between 2–3 microns; 8% by weight of the particles having diameters between 3–4 microns was divided into ten separate batches with each batch being subjected to a shock calcination, a calcination treatment lasting one hour in a muffle furnace, or a combination thereof in accordance with the invention as indicated in Table I below:

TABLE I

| | Calcination | Temp., ° C. | Bulk density, g./l. | Remission at— | |
|---|---|---|---|---|---|
| | | | | 420 m$\mu$ | 570 m$\mu$ |
| (1) | Shock calcination | 800 | 296 | 76.8 | 92.1 |
| (1a) | Muffle furnace | 800 | 538 | 81.2 | 93.4 |
| (1b) | Shock calcination + Muffle furnace | 800+ 1,000 | 340 | 89.2 | 95.7 |
| (2) | Shock calcination | 900 | 332 | 78.8 | 92.3 |
| (2a) | Muffle furnace | 900 | 535 | 83.2 | 93.8 |
| (2b) | Shock calcination + Muffle furnace | 900+ 1,000 | 345 | 89.7 | 95.9 |
| (3) | Shock calcination | 1,000 | 487 | 78.8 | 92.2 |
| (3a) | Muffle furnace | 1,000 | 580 | 87.9 | 95.4 |
| (4) | Shock calcination | 1,100 | 625 | 76.8 | 91.1 |
| (4a) | Muffle furnace | 1,100 | 603 | 88.2 | 95.8 |
| (5) | Initial Kaolin | | 545 | 81.1 | 91.3 |

The shock calcination was effected for a period of time of less than 1 second utilizing a conical reaction chamber and a hot gas stream generated by burning illuminating gas as described in British patent specification 896,966. As may be noted from the table, the combination of the two heat treatments, as shown in tests (1b) and (2b) results in the formation of pigments with higher remission values.

The specific gravity of the specimen formed in test (1b) was determined in a Pyknometer with benzene with evacuation for several hours and found to be about 1.8. As compared to this a value of about 2.5 was found for the specimen of test (3a).

A determination of the brightening power with castor oil-ultramarine blue paste according to DIN 53,191 shows a value of 3–4 times better for the specimen test (1b) in accordance with the invention than with the best specimen obtained by a single heat treatment (3a).

The pigment obtained in test (1b) was separated by air sifting into a fine and coarse fraction, the coarse fraction constituting 20% by weight. The particle size distribution of the coarse portion and the fine portion were determined according to Andreasen (e.g. H. Kittel, Pigmente, Stuttgart 1960, page 101) and were found to be as follows:

| Fine portion: | | | | | | |
|---|---|---|---|---|---|---|
| d[μ] equals | 0.2–1.0 | 1.0–2.0 | 2.0–3.0 | 3.0–4.0 | 4.0–10.0 | >10 |
| Percent per weight of the particles equals | 35 | 34 | 8 | 4 | 12 | 7 |
| Coarse portion: | | | | | | |
| d[μ] as above percent per weight of particles | 11 | 24 | 16 | 5 | 9 | 35 |

An examination of both these portions with an electron microscope did not reveal any particles having a particle size below 0.2 micron.

The treatment in accordance with the invention has thus resulted in an upward displacement of the particle size distribution. The bulk density, however, has been reduced from 545 grams per litre to 340 grams per litre and the specific gravity from 2.6 to 1.8.

EXAMPLE 2

A high-grade elutriated kaolin of the composition

| | Percent |
|---|---|
| $SiO_2$ | 45.25 |
| $Al_2O_3$ | 40.10 |
| $Fe_2O_3$ | 0.24 |
| $TiO_2$ | 0.41 |
| $Na_2O$ | 0.22 |
| $K_2O$ | 0.38 |
| Heat loss | 13.44 | was subjected to various calcination conditions similar to those described in Example 1. In the first series of experiments the starting kaolin was calcined directly at 900–1000° C. in quartz dishes of about 100 grams capacity in an electrically heated muffle furnace. In the second series the starting kaolin was heated at first to 800° C. within less than a second in the manner described. The shock calcination product was then calcined in the muffle furnace at 900 and 1000° C. Some properties of the resulting pigments are shown in Table II below:

TABLE II

| | Calcination | Temp., °C. | Oil adsorption, ml. of linseed oil/g. | Remission at 420 mμ | Remission at 570 mμ | Bulk density, g./l. |
|---|---|---|---|---|---|---|
| (1) | 1 hour muffle furnace | 900 | 1.02 | 83.2 | 93.3 | 550 |
| (2) | 15 minutes muffle furnace | 1,000 | 1.01 | 85.0 | 94.0 | |
| (3) | 1 hour muffle furnace | 1,000 | 1.01 | 86.3 | 95.0 | 550 |
| (4) | 5 hours muffle furnace | 1,000 | 1.00 | 87.9 | 95.5 | |
| (5) | Shock calcination, then | 800 | 1.35 | 81.3 | 87.5 | |
| (6) | 1 hour muffle furnace | 900 | 1.35 | 86.1 | 94.5 | 335 |
| (7) | 15 minutes muffle furnace | 1,000 | 1.25 | 88.2 | 95.3 | |
| (8) | 1 hour muffle furnace | 1,000 | 1.23 | 88.7 | 95.8 | 335 |
| (9) | 5 hours muffle furnace | 1,000 | 1.23 | 90.7 | 96.4 | |
| (10) | Initial Kaolin | | 0.61 | 80.8 | 88.8 | 650 |

It can be seen that the products (6) to (9) which had been subjected according to the invention first to shock calcination at 800° C. and subsequently to a prolonged calcination treatment at 900 and 1000° C., respectively, show in all cases higher remission values, particularly in the blue region, than the samples (1) to (4) which had been calcined directly in the muffle furnace. Moreover, they are more voluminous and adsorb more oil, as is shown by the values for the oil adsorption according to Gardner-Coleman and the bulk density. The remission values of the samples calcined at 1000° C. are higher than the samples calcined at 900° C. Besides, the brightness increases as the calcination period is prolonged. The requisite calcination period depends of course on the type of the furnace and the heat transmission, in this case on the size and the capacity of the quartz dishes used.

The determination of the brightening power with castor oil-ultramarine blue paste shows a value about 4 times better for the samples (8) and (9) as compared with the samples (3) and (4).

EXAMPLE 3

*Determination of the optical efficiency in dispersion paints*

For the determination of the optical efficiency of the pigment produced by the new process, the material prepared according to experiment 1b is examined after separating off the coarse portion (about 20%) by wind sifting, in two dispersion paint series in comparison with some other extender pigments. The pigment samples are soaked in water for 72 hours, subsequently stirred by hand with a binder (polyvinyl acetate dispersion) and the resulting paint is drawn up twice on black-white opaque cardboard by means of the Wasag ruler. The examination covered a paint of a low pigment portion (20% pigment volume concentration—PVC) as well as a paint of a high pigment portion (50% PVC).

| Composition of the dispersion paints | PVC 20%, g. | PVC 50%, g. |
|---|---|---|
| Polyvinyl acetate dispersion, 54% | 100 | 100 |
| Pigment | x | y |
| Water | 120 | 30 |

| | x, g. | y, g. |
|---|---|---|
| Micro mica | 35.5 | |
| Calc. kaolin pigment (sample 3a) Ex. 1 | 30.0 | 119.5 |
| Calc. kaolin pigment (sample 1b) Ex. 1 | 30.0 | 119.5 |
| Precipitated calcium silicate pigment | 24.7 | 98.3 |

(for the sake of simplicity the specific gravity of the kaolin pigments 3a and 1b has been referred to the same value).

The samples are evaluated according to the theory of Kubelka and Munk (H. H. Weber, Farbe und Lack 63, 1957, pages 586–594). The following values are determined for the remissions R∞ and the scattering coefficients S[cm.$^{-1}$]:

| Sample examined | PVC, 20% R∞ | PVC, 20% S | PVC, 50% R∞ | PVC, 50% S |
|---|---|---|---|---|
| Micro mica | 18.4 | 23.4 | | |
| Sample 3a | 74.5 | 61.4 | 93.6 | 1,850 |
| Sample 1b | 86.7 | 215.0 | 96.4 | 2,410 |
| Calcium silicate pigment | 92.9 | 48.8 | 93.6 | 3,610 |

Sample 1b is kaolin treated by the process of the invention, sample 3a is kaolin calcined at 1000° C. according to the usual process. It is evident that the optical values of sample 1b, especially at a low pigment volume concentration, are superior to those of the other extender pigments. Even at a high pigment volume concentration these values are at least better than those of kaolin treated by the prior art process.

EXAMPLE 4

*Brightening power in rubber*

The brightening power in rubber is examined as follows:

| | Parts by weight |
|---|---|
| Styrene-butadiene polymer | 100 |
| Zinc oxide | 5 |
| Stearic acid | 1.5 |
| Non-discoloring plasticizer | 5.0 |
| Diphenyl guanidine | 0.6 |
| Mercapto benzo-thiazole disulfide | 1.2 |
| Sulfur | 1.8 | are mixed with 75 parts by weight of various fillers in the usual manner and vulcanized at 150° C. and 5 atmospheres for about 30 minutes. The remission values of the vulcanizates samples are measured at two different wave lengths $F_3=570$ m$\mu$ and $F_7=420$ m$\mu$ by means of an Elrepho of the firm Zeiss.

| Sample examined | Remission values | |
|---|---|---|
| | $F_3=570$ m$\mu$ | $F_7=420$ m$\mu$ |
| (1b) Ex. 1 | 67.8 | 42.0 |
| (3a) Ex. 1 | 53.7 | 27.5 |
| Dixie clay | 37.5 | 14.8 |
| Dixie clay plus 1.5% TiO$_2$ anatase | 50.2 | 23.4 |

These values clearly show that the brightening power of kaolin treated by the process according to the invention is substantially improved as compared with comparable fillers which have previously been used. The whiteness of the vulcanizates containing the filler 1b is substantially higher than that of the other samples.

The novel kaolin pigment shows a similar superiority as to the brightening power in natural rubber and synthetic rubber types such as butyl rubber, chlorobutadiene, stereo specific rubber types, as well as in plastics, in particular in polyvinyl chloride.

While the invention has been described in detail with reference to certain embodiments, various changes and modifications which fall within the spirit of the invention and scope of the appended claims will become apparent to the skilled artisan. The invention, therefore, is only intended to be limited by the appended claims or their equivalents wherein we have endeavored to claim all inherent novelty.

We claim:

1. A process for the production of calcined pigments from kaolin which consists of dehydrating kaolin clay by shock calcination at a temperature between 600 to 1000° C. for a period of time not in excess of about 1 second in a hot gas stream and thereafter partially crystallizing the shock calcined product into gamma-Al$_2$O$_3$ and mullite by calcining said product in a stream of hot combustion gases at a temperature of between 800 to 1100° C. for a period of time of at least ten minutes.

2. A process according to claim 1 in which said shock calcining is effected in a highly turbulent hot gas stream.

3. A process according to claim 2 in which said shock calcining is effected at a temperature between about 700–900° C.

4. A process according to claim 1 in which said second heat treatment is effected at a temperature between about 900–1000° C.

5. Process according to claim 1 wherein said kaolin clay is preheated to a temperature of up to 500° C.

6. Process according to claim 1 in which said second heat treatment is effected for a period of time of between about ten minutes and 1 hour.

7. A calcined kaolin pigment produced by the process of claim 1.

References Cited by the Examiner

FOREIGN PATENTS 894,383  4/1962  Great Britain.

TOBIAS E. LEVOW, *Primary Examiner.*

HELEN M. McCARTHY, *Examiner.*

J. E. POER, *Assistant Examiner.*

UNITED STATES PATENT AND TRADEMARK OFFICE
CERTIFICATE OF CORRECTION

PATENT NO. : 3,309,214
DATED : March 14, 1967
INVENTOR(S) : Ernst Podschus and Werner Joseph It is certified that error appears in the above—identified patent and that said Letters Patent are hereby corrected as shown below:

Change the number of the British patent specification appearing in column 4, line 57, from "896,966" to --869,966--

Signed and Sealed this

Twenty-second Day of May 1979

[SEAL]

Attest:

RUTH C. MASON
Attesting Officer

DONALD W. BANNER
Commissioner of Patents and Trademarks